United States Patent Office 3,564,754
Patented Feb. 23, 1971

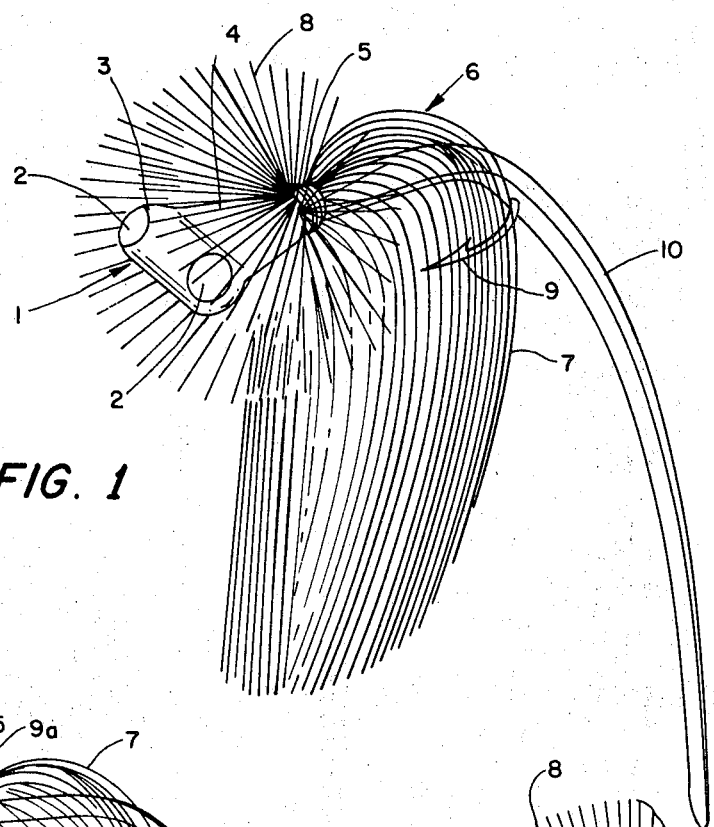
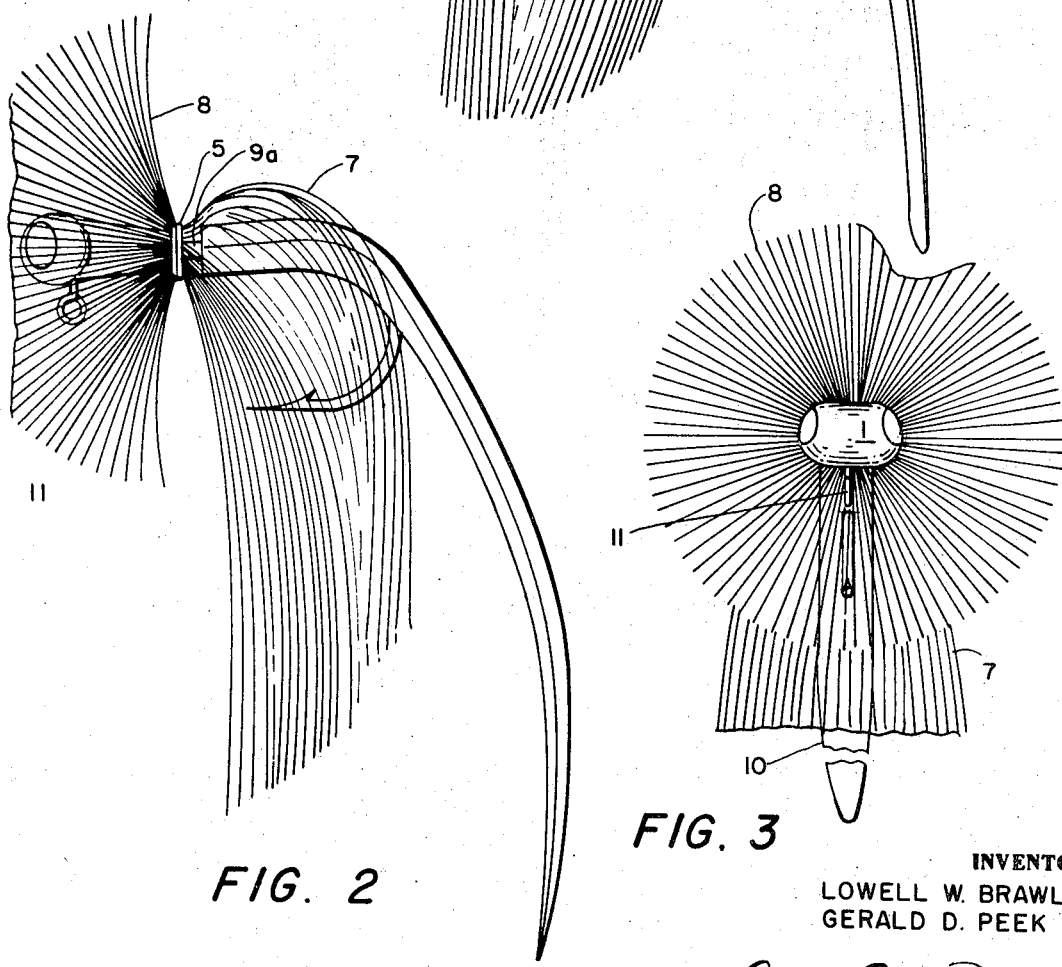
FIG. 1
FIG. 2
FIG. 3
INVENTORS
LOWELL W. BRAWLEY
GERALD D. PEEK
BY Larson and Taylor
ATTORNEYS

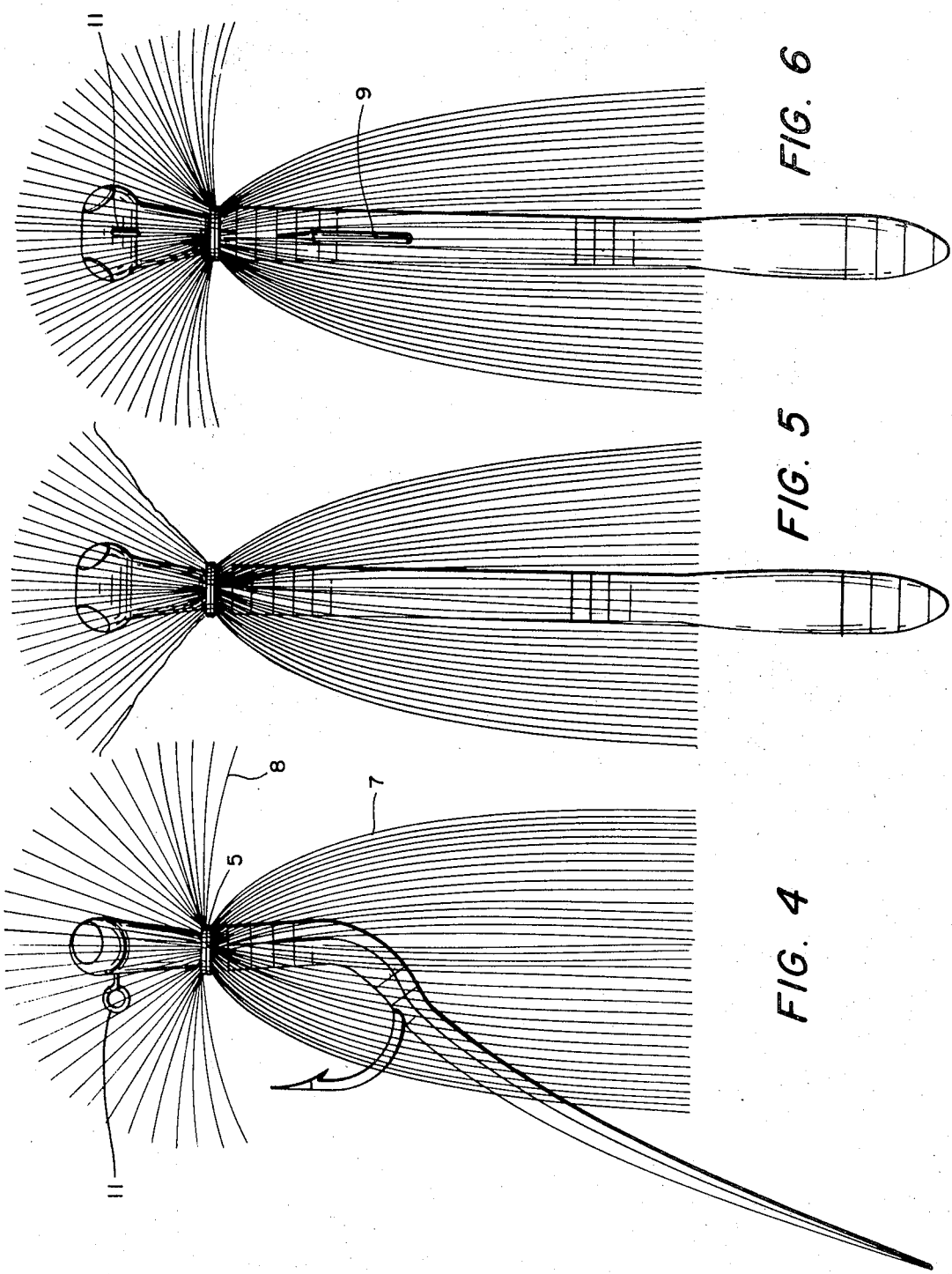

3,564,754
ARTIFICIAL FISHING LURE ARTICLE
Lowell W. Brawley, 1540 Carlton Ave. 95350, and Gerald D. Peek, 1509 Grimes Ave. 95351, both of Modesto, Calif.
Filed Aug. 13, 1969, Ser. No. 849,642
Int. Cl. A01k 85/00
U.S. Cl. 43—42.26                                           10 Claims

ABSTRACT OF THE DISCLOSURE

An artificial fishing lure comprises a weight member with a fish hook having its shank connected thereto, preferably by embedding it in the weight member. Numerous strips of rubber-like material extend along the weight member and hook combination, and are bound thereto by a flexible tie member which is connected at one end to the weight member, preferably by embedding, and is wrapped around the pieces of strip material to bind them intermediate their ends to the assembly. The strips radiate generally outwardly to frame the weight member as viewed from the front. Preferably a rubber worm is impaled on the shank of the hook. The lure is preferably fabricated by embedding the shank of the hook and one end of the flexible tie member in the weight member, either during molding of the weight member or thereafter, followed by the application of the strip pieces. The combination of the weight or body member, the embedded hook, and the embedded flexible tie member can be used in the fabrication of other lures, or for do-it-yourself fabrication of the preferred lure.

BACKGROUND AND SUMMARY OF THE INVENTION

This invention relates to improved artificial fishing lures, and to an article of manufacture useful in fabricating artificial fishing lures, either in the factory or at home.

It is, of course, an object of this invention to provide an improved artificial fishing lure, primarily for bass fishing, which will achieve the obvious purpose of any artificial fishing lure. As with all lures, the primary features of the invention which are directed toward accomplishing this purpose are appearance of the lure and action of the lure when in use. These are, of course, intangible factors, and it is extremely difficult if not impossible for anyone to say with any reasonable degree of certainty that one or the other feature of a particular lure is the key to its success. However, in the instant invention, it is believed that the important features of the invention in this regard, apart from the general overall appearance of the lure, revolve about the plurality of rubber strips which are incorporated in the lure, and primarily involve the relatively short rubber strips which radiate generally outwardly and forwardly from an area immediately behind the simulated head of the lure, these strips serving to frame the simulated head on a backgrround of numerous radiating strips which become very active and busy when the lure is being used.

In addition to the features of a lure which contribute to its primary purpose, other desirable features of a lure should be directed toward ease and economy of manufacture or fabrication. Thus, further objects of the invention relate to providing a lure which can be fabricated in a relatively simple manner and at a relatively economical cost. Finally, many fishermen, either because of personal preference or for reasons of economy, fabricate their own lures. It is, therefore, a further object of the invention to provide as an article of manufacture a combination which facilitates the fabrication by fishermen of lures as described and illustrated herein, or lures of other designs and appearances.

In general, an artificial fishing lure in accordance with the invention comprises a weight or body member to which a fish hook is connected adjacent its shank end. A plurality of pieces of flexible and resilient strip material are disposed about the weight or body member and the shank of the hook, and extend forwardly over at least part of the weight member and rearwardly over at least part of the hook; a flexible tie member is connected at one end to the weight member and extends therefrom around the pieces of strip material to bind the pieces intermediate their ends to the assembly comprising the weight member and the hook. Preferably, although not necessarily, both the hook and the flexible tie member are embedded in the weight or body member, and extend therefrom in the same general area. The flexible tie member preferably comprises a piece of flexible wire, usually of relatively soft metal, so that it will assume and hold its wrap-around configuration, at least until it is manually unwrapped. The strip material preferably is of a rubber-like material, such as neoprene, and is flexibly resilient, with sufficient stiffness to be substantially self-supporting in relatively short lengths. Thus, short portions of the strip can radiate outwardly from the main portion of the lure in self-supporting fashion, but yet these short strips will be very active and busy when in use, thus serving as an enticement to any fish in the neighborhood. The forwardly extending portions of the strips are caused to radiate outwardly because of the tightness of the binding by the flexible tie member, and also because of the binding of the flexible tie member immediately adjacent the point where the hook shank exits from the weight or body member, the increased cross section of the body member at this point deflecting the strips outwardly. Preferably an artificial rubber worm is impaled on the shank of the hook, and extends rearwardly from a point closely adjacent the binding area of the flexible tie member.

As it relates to an article of manufacture for use in fabricating artificial fishing lures, the invention generally comprises a combination of the weight member, a fish hook connected to the weight member, and the flexible tie member connected to the weight member for wrapping around and binding additional members to at least one of the weight member and the hook.

Other and further objects, features, advantages, characteristics, and the like, will be apparent from the ensuing description of a preferred embodiment of the invention in its various aspects, taken with reference to the accompanying drawings of a preferred embodiment.

BRIEF DESCRIPTION OF THE DRAWINGS

FIG. 1 is a general perspective view of a preferred embodiment of the invention generally as it would appear if supported horizontally by, for instance, the weight or body member.

FIGS. 2 and 3 are, respectively, right side and front views of the lure supported as in FIG. 1.

FIGS. 4, 5 and 6 are, respectively, right side, top, and bottom views of the preferred embodiment generally as it would appear when supported substantially vertically by, for instance, the weight or body member.

DESCRIPTION OF THE PREFERRED EMBODIMENTS

Figure 7:
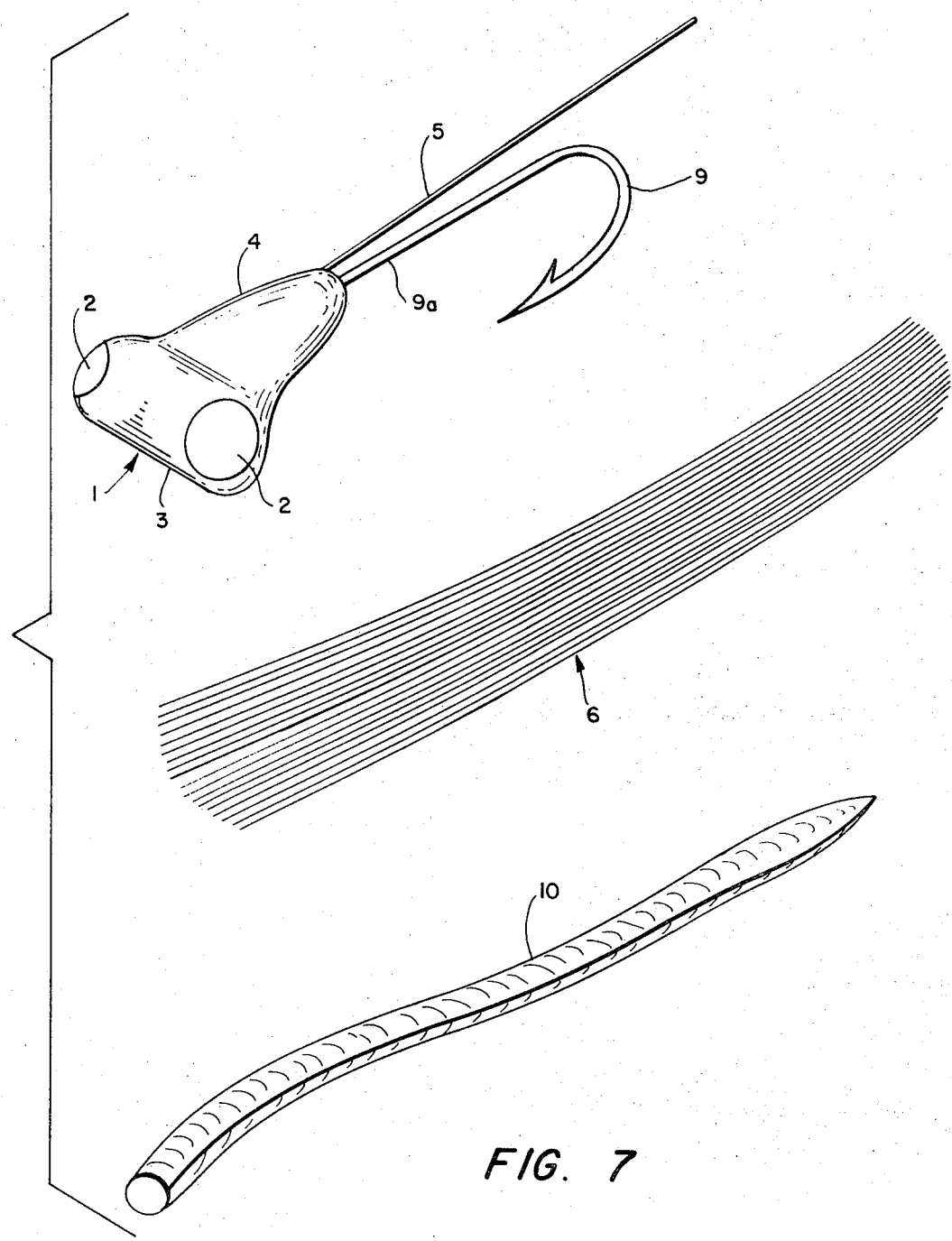
FIG. 7 is an exploded view of the basic components from which the preferred embodiment is fabricated.

Referring to the drawings, the preferred embodiment of a lure constructed in accordance with the invention comprises basically a weight or body member 1, a hook 9, an artificial rubber worm 10, strips 6 of rubber-like material, and a flexible tie member 5 which binds the strips to the lure. The weight or body member 1 is a molded member, usually of lead, and is formed with an enlarged head portion 3, simulated eyes 2 (usually painted in a contrasting color from the remainder of the member 1), and a tapered portion 4. The hook 9 has part of its shank embedded in the body member 1, and has its eye 11 extending therefrom on the underside of the member 1. The hook preferably has its eye 11 extending substantially perpendicularly from the shank 9a of the hook, and generally in the plane of the bent and barbed end of the hook. The hook can be embedded in the member 1 during molding thereof, or thereafter by inserting the shank in a split in the member 1, and forcing the split together, much in the manner of a conventional split shot. A conventional artificial rubber worm 10 is impaled on the hook in a known manner, and extends generally to the vicinity of the rear of the weight or body member 1. A plurality of strips of rubber-like material are disposed about this assembly and are bound thereto by a flexible tie member 5, usually a wire of relatively soft metal, which has one end embedded in the weight or body member 1, either during the molding process or thereafter through the split shot method referred to above. The point at which the flexible tie member 5 binds the strips 6 to the assembly preferably is immediately adjacent the tapered rear end of the weight or body member 1, the tie member 5 being wrapped around the shank of the hook where it exits from the member 1, whereby those portions 8 of the strips 7 are caused to radiate generally outwardly of the main body of the lure, in addition to their forward inclinations, as shown best in FIGS. 2 and 4–6. This causes the strip portions 8 generally to frame the body member 1 on a background of generally radially extending flexible strips 8 when viewed from the front, as illustrated in FIG. 3. These radially extending and relatively short strip portions 8 are sufficiently stiff to support themselves in the general manner illustrated, but yet are sufficiently flexible and resilient that they are very active and "busy" when the lure is in use. This seems to have proved to be very enticing to bass. The longer strip portions 7 extend generally rearwardly from the point of binding, and when the lure is in use in the water they usually assume configurations somewhere between the configuration illustrated in FIG. 2 and that illustrated in FIGS. 4–6. This is true also of the rearwardly extending portion of the rubber worm beyond the hook.

The wire material comprising flexible tie member 5 need merely be wrapped around the strips 6 and the shank of the hook to complete the binding, and it will hold this binding action until manually unwound therefrom. Should the strips 7 become excessively damaged or broken, it is not at all difficult to unwind the tie member 5, dispose new strips about the assembly, and re-wrap the tie member 5 to bind anew the strips to the assembly.

It is relatively important that the strips 6 be of such length and so disposed relative to the binding point of the flexible tie member 5 that the forward strip portions 8 are not too long to support themselves in the general manner illustrated in the drawings. If the forward strip portions 8 are excessively long, they will not be self-supporting as desired, and would tend to assume configurations more in keeping with the rear strip portions 7. Although the length of the strip portions 8 will vary with the size of the lure, and with the size and material of the strips themselves, thus rendering it substantially impossible to specify a particular length or range of lengths, one presently preferred embodiment is arranged such that the strip portions 8 are approximately one inch long. The portions 8 thus radiate outwardly as desired, but yet are extremely active adjacent their outer extremities. The rearward strip portions 7, on the other hand, can be of widely different lengths, either relatively long as shown, or relatively shorter to the extent that they would approach the configuration and orientations of the forward strip portions 8. Although they preferably should be long enough to substantially camouflage the bent and barbed end of the hook, this is not critical.

The strips 6 can be of substantially any flexible and resilient material, but preferably should be of rubber or a rubber-like material which will not become waterlogged. A gummed neoprene product has been found to be very satisfactory. The number of strips used is not critical, but preferably their size and number should be such as to convey the general appearance illustrated in the drawings. In one anticipated commercial embodiment, 120 strips of gummed neoprene were used, and proved very satisfactory. The strips should be disposed substantially uniformly about the assembly, but absolute uniformity is by no means essential.

The strip portions 8 can be caused to radiate outwardly more or less as preferred by varying the taper and size of the rear portion of the member 1 or by locating the point of binding by the tie member 5 closer to or further removed from the rear end of the member 1. In general, we prefer to have the strip portions 8 radiate forwardly and outwardly at an angle such that their extreme outer ends lie slightly forward of the front end of the member 1.

In an anticipated commercial embodiment, the hook is a jig hook made by Eagle Claw, style 570, size 3/0, and is of the limber type that can be straightened by working the line if it snags on an object.

The weight or body member can be of substantially any desired configuration, although the illustrated configuration is presently preferred.

The tie member 5 can be substantially any wire material, preferably rust resistant, and of relatively soft metal so as to be easily usable.

The preferred method of manufacturing or fabricating the lure is to mold the weight or body member 1, and to embed the hook and the tie member 5 in the member 1 during the molding process. Alternatively, the molded member 1, if of lead or some similar material, can be split, the hook shank and the tie member inserted, and embedded therein by closing the split, much in the manner of a conventional split shot weight. The hook, weight member, and tie member are thereafter painted in a selected color or colors, a black body with white eyes having been found very satisfactory. The strips 6 are then disposed about and bound to the shank of the hook by the tie member 5. The assembly is completed by impaling the artificial rubber worm on the hook.

It is to be noted that the point at which the tie member 5 binds the strips 6 to the assembly need not necessarily be on the shank of the hook, but could be about a rearward portion of body member 1, or a specially molded rearwardly extending portion of body member 1. However, binding about the shank of the hook immediately adjacent the rearmost portion of the member 1 is presently preferred. It is further to be noted that the hook need not necessarily be embedded in the member 1, but instead could be connected by its eye to a separate eye member embedded in the member 1. Again, it is presently preferred to embed the hook in the member 1 as described and illustrated previously.

Selected colors will, of course, vary with geographical areas, and with the time of the year. We have found an assembly completely black, except for white eyes, to be very satisfactory.

As previously mentioned, the article of manufacture comprising a weight or body member 1, an embedded or otherwise connected flexible tie member 5, and an embedded or otherwise connected hook 9 is a highly useful article for home fabrication of lures by fishermen, as well as for normal commercial fabrication in the factory. The article consisting of these three members can be manufactured and sold either in painted or unpainted form. Forms of lure dress other than rubber-like strips could be used in connection with the article for fabricating lures other than the illustrated preferred embodiment. Hair, feathers, and the like would be possible substitutes. Pork rind would be a possible substitute for the conventional artificial rubber worm.

Having thus described our invention in the manner required by the patent statutes, we claim:

1. An artificial fishing lure comprising a weight member, a fish hook having its shank connected to said weight member and its bent and barbed end extending rearwardly therefrom, a plurality of pieces of strip material disposed about said weight member and said shank and extending forwardly over at least part of said weight member and rearwardly over at least part of said hook, and a flexible tie member connected at one end to said weight member and extending therefrom around said pieces of strip material to bind said pieces intermediate their ends to the assembly comprising said weight member and said hook, wherein said flexible tie member has only said one end completely and immovably embedded in said weight member and independently of and separately from the connection between the fish hook shank and weight member.

2. An artificial fishing lure as claimed in claim 1 wherein said flexible tie member comprises a piece of flexible wire which can be bent as desired and which will retain its bent configuration until re-bent.

3. An artificial fishing lure as claimed in claim 2 wherein said hook has its shank at least partially embedded in said weight member, and has its eye extending from said weight member.

4. An artificial fishing lure as claimed in claim 1 wherein said pieces of strip material comprise strips of a flexible resilient rubber-like material of sufficient stiffness that short lengths thereof can radiate from the point of binding and substantially support themselves in cantilever fashion.

5. An artificial fishing lure as claimed in claim 4 wherein said strips are of a gummed neoprene material and have generally rectangular cross-sections.

6. An artificial fishing lure as claimed in claim 4 wherein said flexible tie member binds said strips to said shank immediately adjacent said weight member, and wherein said weight member adjacent said point of binding is of larger cross-section than said shank, whereby said strips are caused to radiate outwardly as they extend forwardly over said weight member, whereby to shroud said weight member and to frame said weight member on a background of generally radially extending strips as viewed from the front of said weight member.

7. An artificial fishing lure as claimed in claim 1 further comprising an artificial rubber worm impaled on the shank of said hook and extending generally rearwardly therealong, the bent and barbed end of said hook exiting from said rubber worm intermediate the ends thereof, the front end of said rubber worm extending closely adjacent the point where said flexible tie member binds said pieces of strip material.

8. An artificial fishing lure as claimed in claim 1 wherein said weight member comprises a simulated head with simulated eyes thereon.

9. An artificial fishing lure as claimed in claim 1 wherein the portions of said pieces of strip material which extend forwardly over said weight member are substantially shorter than the rearwardly extending pieces.

10. An article of manufacture for use in fabricating artificial fishing lures, comprising a weight member, a fish hook connected to said weight member such that the bent and barbed end of the hook extends from said weight member, and a flexible tie member connected to said weight member for wrapping around and binding additional members to at least one of said weight member and said hook, wherein said flexible tie member is a ductile metal wire having only one end completely and immovably embedded in said weight member and independently of and separately from the connection between the fish hook shank and weight member.

References Cited
UNITED STATES PATENTS

| | | | |
|---|---|---|---|
| 662,139 | 11/1900 | Warren | 43—42.24 |
| 1,062,726 | 5/1913 | Nelson | 43—44.4 |
| 1,589,065 | 6/1926 | Gere et al. | 43—42.27 |
| 1,734,883 | 11/1929 | Shannon | 43—42.28X |
| 1,851,529 | 3/1932 | Stapf | 43—42.25 |
| 1,884,053 | 10/1932 | McGarraugh | 43—42.28 |
| 2,544,265 | 3/1951 | Kelly et al. | 43—42.53 |
| 2,618,094 | 11/1952 | Shindler | 43—42.24 |
| 2,618,095 | 11/1952 | Igo | 43—42.24 |
| 2,865,130 | 12/1958 | Accetta | 43—42.53X |
| 3,191,336 | 6/1965 | Cordell | 43—42.53X |

SAMUEL KOREN, Primary Examiner

J. F. PITRELLI, Assistant Examiner

U.S. Cl. X.R.

43—42.28, 42.53